US012488744B2

(12) United States Patent
Hatano

(10) Patent No.: US 12,488,744 B2
(45) Date of Patent: Dec. 2, 2025

(54) DISPLAY APPARATUS, PHOTOELECTRIC CONVERSION APPARATUS AND ELECTRONIC DEVICE

(71) Applicant: CANON KABUSHIKI KAISHA, Tokyo (JP)

(72) Inventor: Yuuichirou Hatano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 339 days.

(21) Appl. No.: 17/688,937

(22) Filed: Mar. 8, 2022

(65) Prior Publication Data

US 2022/0293055 A1 Sep. 15, 2022

(30) Foreign Application Priority Data

Mar. 11, 2021 (JP) ................................ 2021-039531
Dec. 2, 2021 (JP) ................................ 2021-196468

(51) Int. Cl.
*G09G 3/3233* (2016.01)
*H04N 23/63* (2023.01)

(52) U.S. Cl.
CPC ........... *G09G 3/3233* (2013.01); *H04N 23/63* (2023.01); *G09G 2300/0413* (2013.01); *G09G 2300/0452* (2013.01); *G09G 2300/0852* (2013.01); *G09G 2310/08* (2013.01)

(58) Field of Classification Search
None
See application file for complete search history.

(56) References Cited

U.S. PATENT DOCUMENTS 8,305,305 B2 11/2012 Ono
2009/0085844 A1 4/2009 Yamashita
2009/0284515 A1* 11/2009 Tsuge .................. G09G 3/3233 345/76
2010/0117998 A1* 5/2010 Yamashita ........... G09G 3/3233 345/204
2011/0248906 A1* 10/2011 Asano .................. G09G 3/3611 345/55

(Continued)

FOREIGN PATENT DOCUMENTS

JP 2009-080366 A 4/2009
JP 2009-222779 A 10/2009

(Continued)

OTHER PUBLICATIONS

Jul. 25, 2025 Japanese Official Action in Japanese Patent Appln. No. 2021-196468.

*Primary Examiner* — Nitin Patel
*Assistant Examiner* — Sarvesh J Nadkarni
(74) *Attorney, Agent, or Firm* — Venable LLP

(57) ABSTRACT

A display apparatus includes a plurality of pixels arranged in a manner forming a plurality of rows and a plurality of columns; a plurality of first column signal lines configured to supply a signal potential to the plurality of pixels in accordance with video data, and at least one second column signal line configured to supply a reference potential to the plurality of pixels. The plurality of first column signal lines and the at least one second column signal line are arranged along columns of the plurality of pixels, and the at least one second column signal line is commonly connected to pixels of at least two columns, among the plurality of pixels.

20 Claims, 12 Drawing Sheets

(56) References Cited

U.S. PATENT DOCUMENTS

| | | | | |
|---|---|---|---|---|
| 2012/0229438 | A1* | 9/2012 | Fujita | G09G 3/3266 345/211 |
| 2013/0241906 | A1* | 9/2013 | Asano | G09G 3/3233 345/82 |
| 2015/0015468 | A1* | 1/2015 | Ko | G09G 3/3233 345/82 |
| 2017/0309227 | A1* | 10/2017 | Ebisuno | H10K 59/131 |
| 2018/0144705 | A1* | 5/2018 | Lee | G09G 3/3225 |
| 2018/0151661 | A1* | 5/2018 | Oh | H10D 86/40 |
| 2018/0261627 | A1* | 9/2018 | An | G09G 3/36 |
| 2018/0315802 | A1 | 11/2018 | Kamiyama | |
| 2020/0043421 | A1* | 2/2020 | Kang | G09G 3/3275 |
| 2020/0143741 | A1* | 5/2020 | Tsuboi | G09G 3/3233 |
| 2021/0375213 | A1* | 12/2021 | Gao | G09G 3/3233 |
| 2022/0122528 | A1* | 4/2022 | Kim | G09G 3/3225 |

FOREIGN PATENT DOCUMENTS

| | | | |
|---|---|---|---|
| JP | 2010-128183 | A | 6/2010 |
| JP | 2011-221255 | A | 11/2011 |
| JP | 2012-189828 | A | 10/2012 |
| JP | 2018-045186 | A | 3/2018 |
| JP | 2018-186046 | A | 11/2018 |
| WO | 2009/011092 | A1 | 1/2009 |

* cited by examiner

DISPLAY APPARATUS, PHOTOELECTRIC CONVERSION APPARATUS AND ELECTRONIC DEVICE

BACKGROUND OF THE INVENTION

Field of the Invention

The present invention relates to a display apparatus, a photoelectric conversion apparatus, and an electronic device.

Description of the Related Art

A display apparatus using organic electroluminescence (hereinafter, organic EL) film, having light-emitting elements provided on each pixel, displays an image by individually controlling light emission. In Japanese Patent Laid Open No. 2018-045186 A (hereinafter PTL 1), there are arranged, individually along each column of pixels, a first video signal line that applies a signal potential in accordance with video data, and a second video signal line that applies a potential to be a reference of the video data. Here, initialization and threshold compensation of a first pixel column and a second pixel column adjacent to the first pixel column are simultaneously performed. Subsequently, there is proposed a display apparatus that achieves high definition by sequentially writing predetermined video data, while suppressing occurrence of display failure.

In the aforementioned example, two video signal lines are arranged between respective pixels, which may prevent achieving high definition of the display apparatus.

SUMMARY OF THE INVENTION

In view of the aforementioned problem, the display apparatus according to the present invention is a display apparatus including, a plurality of pixels arranged in a manner forming a plurality of rows and a plurality of columns; a plurality of first column signal lines configured to supply a signal potential to the plurality of pixels in accordance with video data, and at least one second column signal line configured to supply a reference potential to the plurality of pixels, wherein each of the plurality of pixels includes, a light-emitting element, a driving transistor configured to drive the light-emitting element, a first selecting transistor configured to supply the signal potential from the first column signal line to a control electrode of the driving transistor, and a second selecting transistor configured to supply the reference potential from the second column signal line to the control electrode of the driving transistor, the plurality of first column signal lines and the at least one second column signal line are arranged along columns of the plurality of pixels, and the at least one second column signal line is commonly connected to pixels of at least two columns, among the plurality of pixels, via the second selecting transistor.

Further features of the present invention will become apparent from the following description of exemplary embodiments with reference to the attached drawings.

DESCRIPTION OF THE EMBODIMENTS

Figure 1:
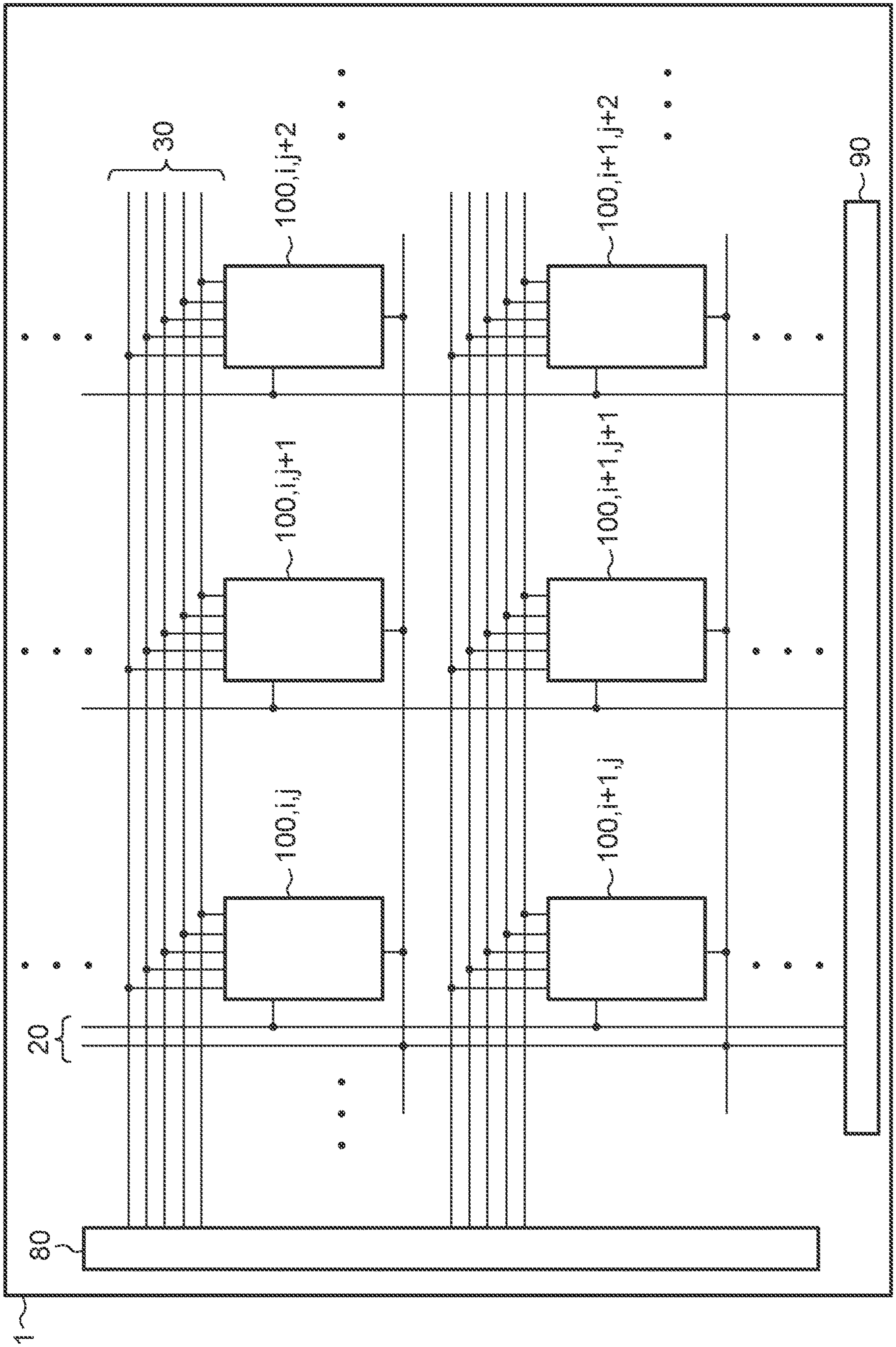
FIG. 1 is a schematic configuration diagram of a display apparatus according to an embodiment of the present technique.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a schematic configuration diagram of a display apparatus according to the present disclosure. A display apparatus 1 includes a scanning line driving circuit 80, a column signal line driving circuit 90, and a plurality of pixels 100 including light-emitting elements. The scanning line driving circuit 80 has a plurality of scanning lines 30 connected thereto, and the column signal line driving circuit 90 has a plurality of column signal lines 20 connected thereto. Here, a pixel 100, *i, j* represents a pixel arranged at an i-th row and a j-th column, among pixels arranged in a manner forming a plurality of rows and a plurality of columns.

The outline of the pixel circuit and the signal lines will be described, referring to the circuit diagram illustrated in FIG. 2. A first column signal line 101 and a second column signal line 102 are connected to the column signal line driving circuit 90. The scanning line driving circuit 80 has connected thereto a first scanning line 105, a second scanning line 106, a third scanning line 107, a fourth scanning line 108, and a power source line 109. The lines are respectively connected to respective transistors in a pixel circuit 110 included in the pixel 100.

Here, the pixel 100, *i, j* will be described. The pixels 100, *i, j* and 100, *i, j*+1 respectively include a first selecting transistor 103, a pixel circuit 110, and a second selecting transistor 104. The signal of the second column signal line 102, via a common signal line 116, turns out to be an output from the second selecting transistor 104 becoming an input signal to each pixel circuit 110.

The first column signal lines 101, *j* and 101, *j*+1 are supplied with a potential of a signal (hereinafter, signal potential) from the column signal line driving circuit 90, in accordance with video data. The second column signal line 102, *j* is supplied with a potential (hereinafter, reference potential) from the column signal line driving circuit 90, which turns out to be a reference of the video data. The reference potential is used for a reset operation of a pixel or threshold compensation of a driving transistor. In the present embodiment, the reference potential supplied from the second column signal line 102, j is commonly written to pixels aligned in a row (e. g., 100, *i, j*, 100, *i, j*+1, 100, *i, j*+2 . . . ). The scanning line driving circuit 80 supplies pixels with signal pulses for driving the pixels via the scanning lines 105 to 108. Here, the pixel circuit 110 includes a first holding capacitor 121, a second holding capacitor 122, a light-emitting element 123, a driving transistor 124, a light emission control transistor 125, and a reset transistor 126. In addition, although transistors are described here as having a P-type MOS structure, the present invention is not limited thereto. A transistor having an N-type MOS structure may be used, or both types may be combined. In such a case, circuit connection may be changed as appropriate.

Figure 2:
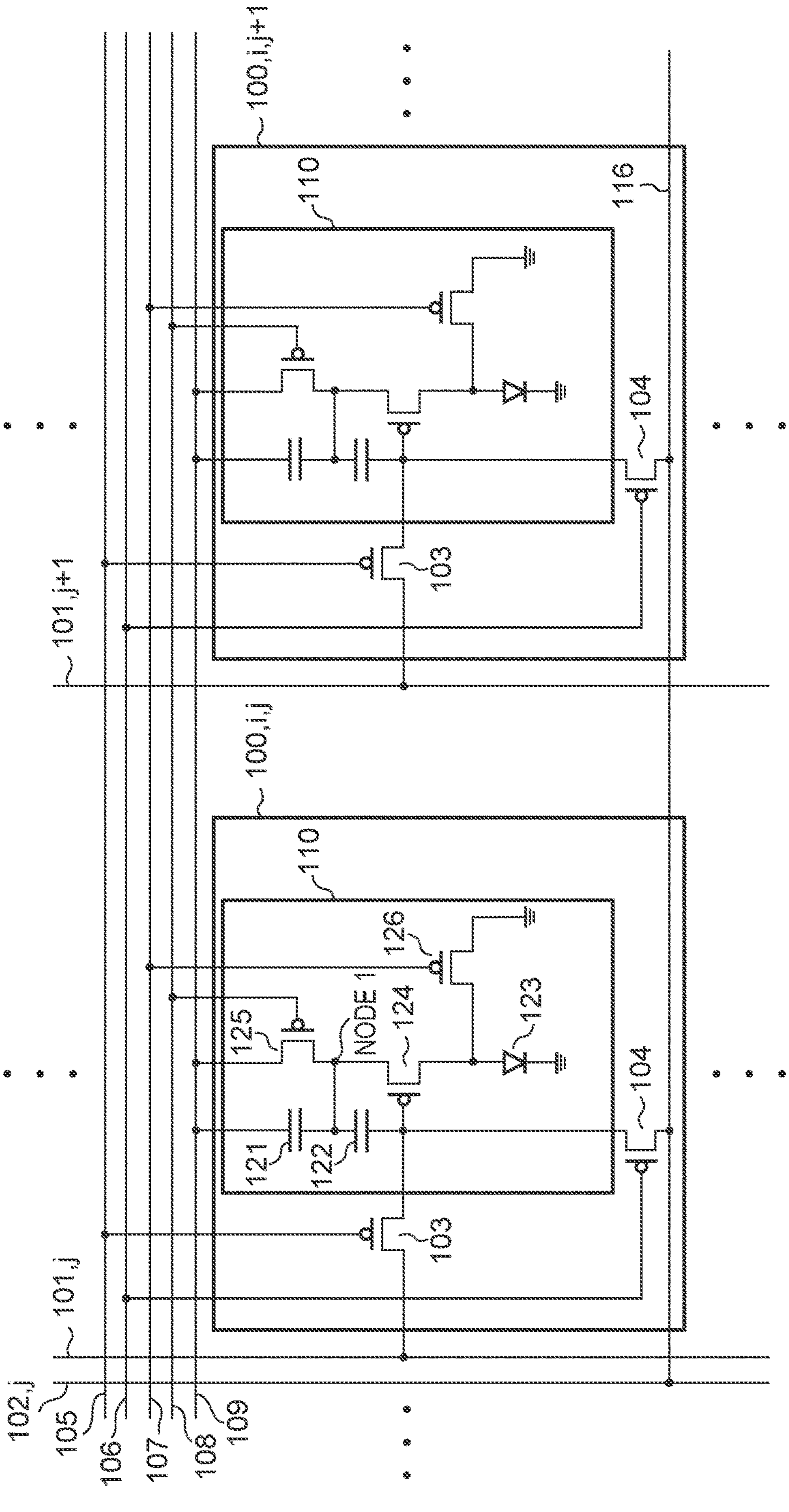
FIG. 2 is a pixel circuit example according to an embodiment.
Figure 3:
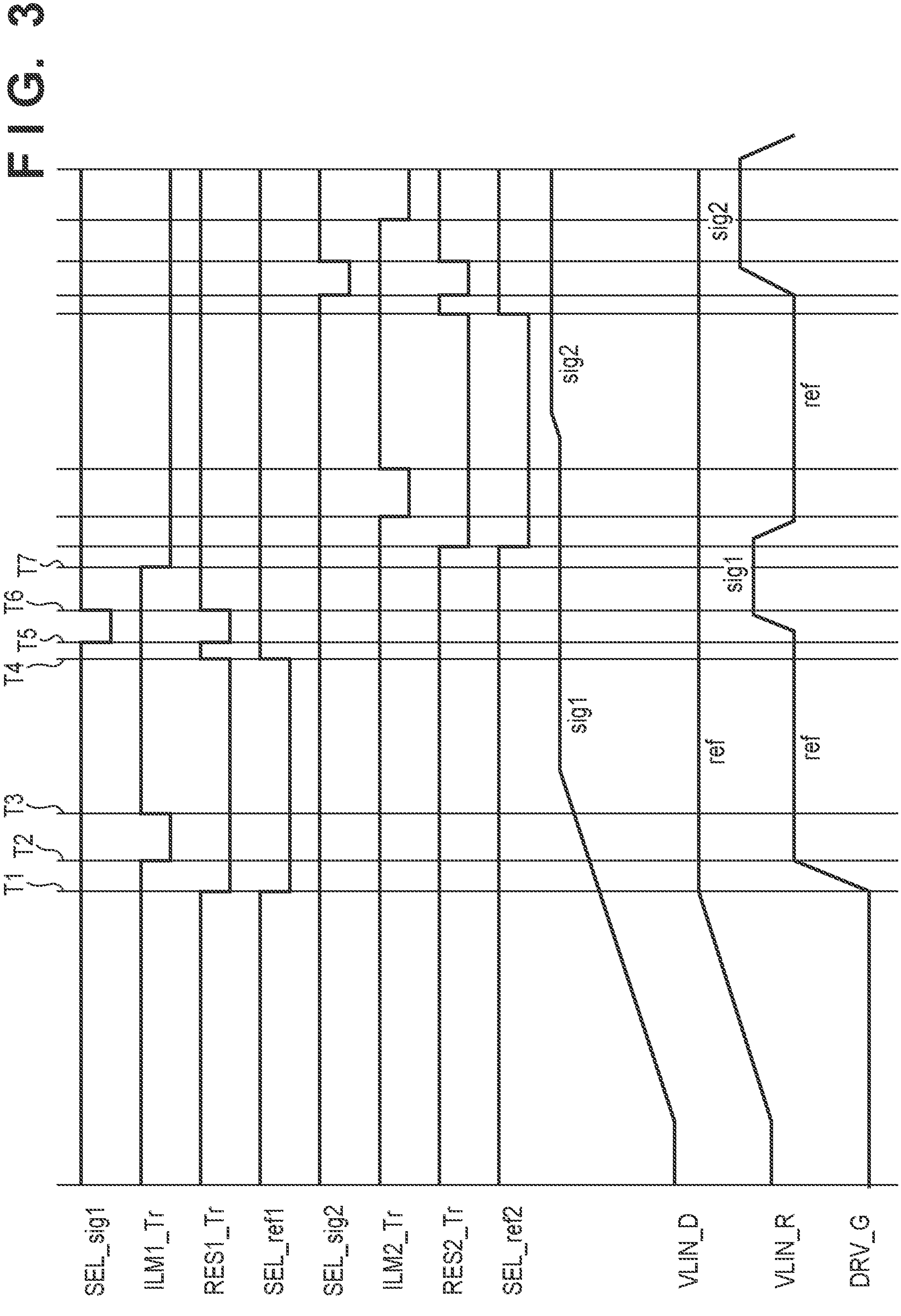
FIG. 3 is a timing chart for explaining a pixel driving method.

FIG. 3 is a timing chart illustrating a driving method for the circuit illustrated in FIG. 2. As a specific driving, a potential VLIN_R of the second column signal line 102 is set to a reference potential ref by a time point T1. SEL_ref1 is controlled at the time point T1 to turn on (ON) the second selecting transistor 104, and the reference potential ref is written to a connection point between a control electrode (gate) of the driving transistor 124 and one side of the second holding capacitors 122. RES1_Tr is correspondingly controlled to turn ON the reset transistor 126, thereby discharging electric charge of a node 1 at which one side of the first holding capacitors 121 and one side of the second holding capacitors 122 are connected, and resetting the potential.

ILM1_Tr is controlled at a time point T2 to turn ON the light emission control transistor 125 and pre-charge the node 1, then ILM1_Tr is controlled at a time point T3 to turn OFF the light emission control transistor 125. Accordingly, the terminal potential of the holding capacitor 122 keeps changing until it settles, whereby the threshold potential of the driving transistor 124 is maintained with respect to the reference potential. The second selecting transistor 104 is turned OFF at a time point T4, then the SEL_sig1 is controlled at a time point T5 to turn ON the first selecting transistor 103. Accordingly, a signal potential sig1, which is the potential VLIN_D of the first column signal line 101, is written to the connection point between the gate of the driving transistor 124 and one side of the second holding capacitor 122. Subsequently, the first selecting transistor 103 turned OFF at a time point T6 to maintain the written signal potential, and ILM1_Tr is controlled at a time point T7 to turn ON the light emission control transistor 125, causing the light-emitting element 123 to emit light. Hereinafter, subsequent rows are displayed in sequence.

In contrast to the conventional manner of arranging a single column signal line along each column pixels, the present embodiment allows for writing the reference potential and the signal potential via separate column signal lines, and therefore it is possible to perform writing at a high frame rate, minimizing the influence of the time constant of the column signal line. In addition, sharing the second column signal line 102 for writing the reference potential by a plurality of pixels allows for narrowing the arrangement interval along each row of pixels, whereby a high-definition display apparatus can be realized.

Figure 4:
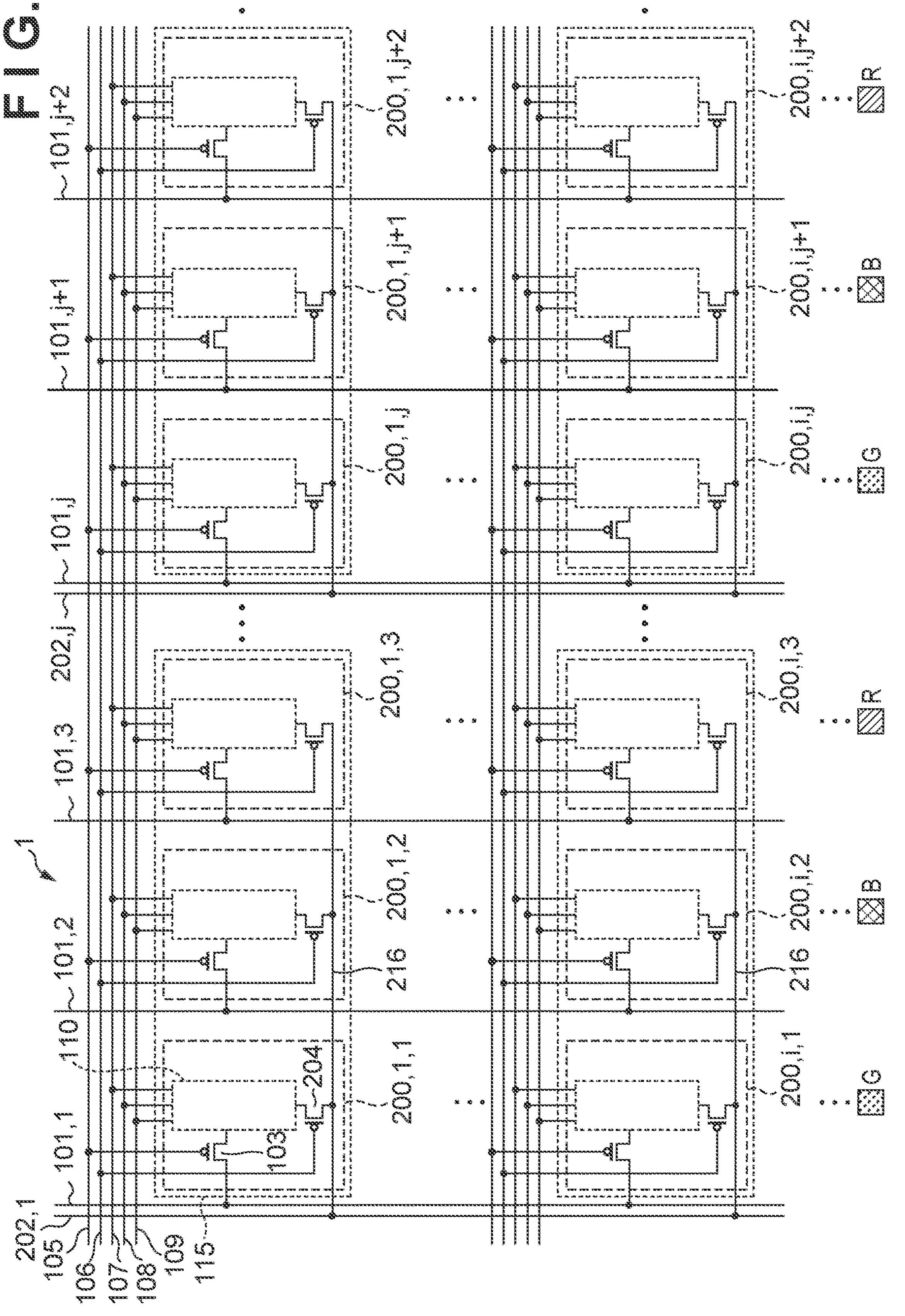
FIG. 4 is an exemplary configuration of a display apparatus according to an embodiment.

Referring to FIG. 4, there will be described an embodiment based on units of pixels exhibiting different light emitting colors. In the present embodiment, pixels 200 exhibiting different light emitting colors will be explained, taking as an example R-pixels that control red light emission, G-pixels that control green light emission, and B-pixels that control blue light emission. In the present embodiment, pixels adjacent to each other are aligned in a manner exhibiting different light emitting colors. Respective ones of the pixels 200, each exhibiting a different light emitting color, are taken to form a unit. The unit will be referred to as a pixel unit 115. Although a plurality of the pixel units 115 are arranged in a stripe to align with each other in the present embodiment, the manner of arrangement is not limited thereto. In the present embodiment, one of the second column signal lines 202 is arranged to be shared by three pixels 200 included in the pixel units 115, so that the reference signal is written to the three pixels 200 by a second selecting transistor 204 via a common signal line 216. Here, the pixel unit 115 has pixels arranged thereon in the order of green (G), blue (B) and red (R), assuming that the material employed for organic EL film to be used for pixels exhibiting different light emitting colors satisfies the relation G-pixels>R-pixels>B-pixels in terms of light emitting intensity. The following embodiments will also be described, assuming the foregoing relation.

In FIG. 4, the second column signal lines 202 can be arranged along the green (G) pixels of the unit 115. When arranging the pixels 200 in a regular-interval layout, the pixels along which the second column signal lines 202 are arranged may include a narrower intra-pixel region than pixels without them. The aforementioned relation given in terms of light emitting intensity allows the G-pixels to reduce the current flowing into the light-emitting elements in comparison with the R-pixels and B-pixels, whereby it is possible to reduce the light emitting region in comparison with the R- and B-pixels. Therefore, the second column signal lines 202 are arranged along the G-pixels. As a result, the present example allows for suppressing decrease of light emitting intensity even when pixel circuits included in the pixels 200 are arranged at regular intervals. However, the arrangement for the G-pixels is merely an example, and column signal lines may be arranged for pixels exhibiting other light emitting colors, depending on the purpose and application, and the material employed for the organic EL film. According to the present embodiment, separating the first column signal line 101 and the second column signal line 202 allows for writing signals to pixels at a high speed. Furthermore, communizing the second column signal line 202 for the pixel unit 115 allows for narrowing pixel intervals and reducing the area of pixel layout. The foregoing allows for achieving high definition while maintaining a high frame rate.

Figure 5:
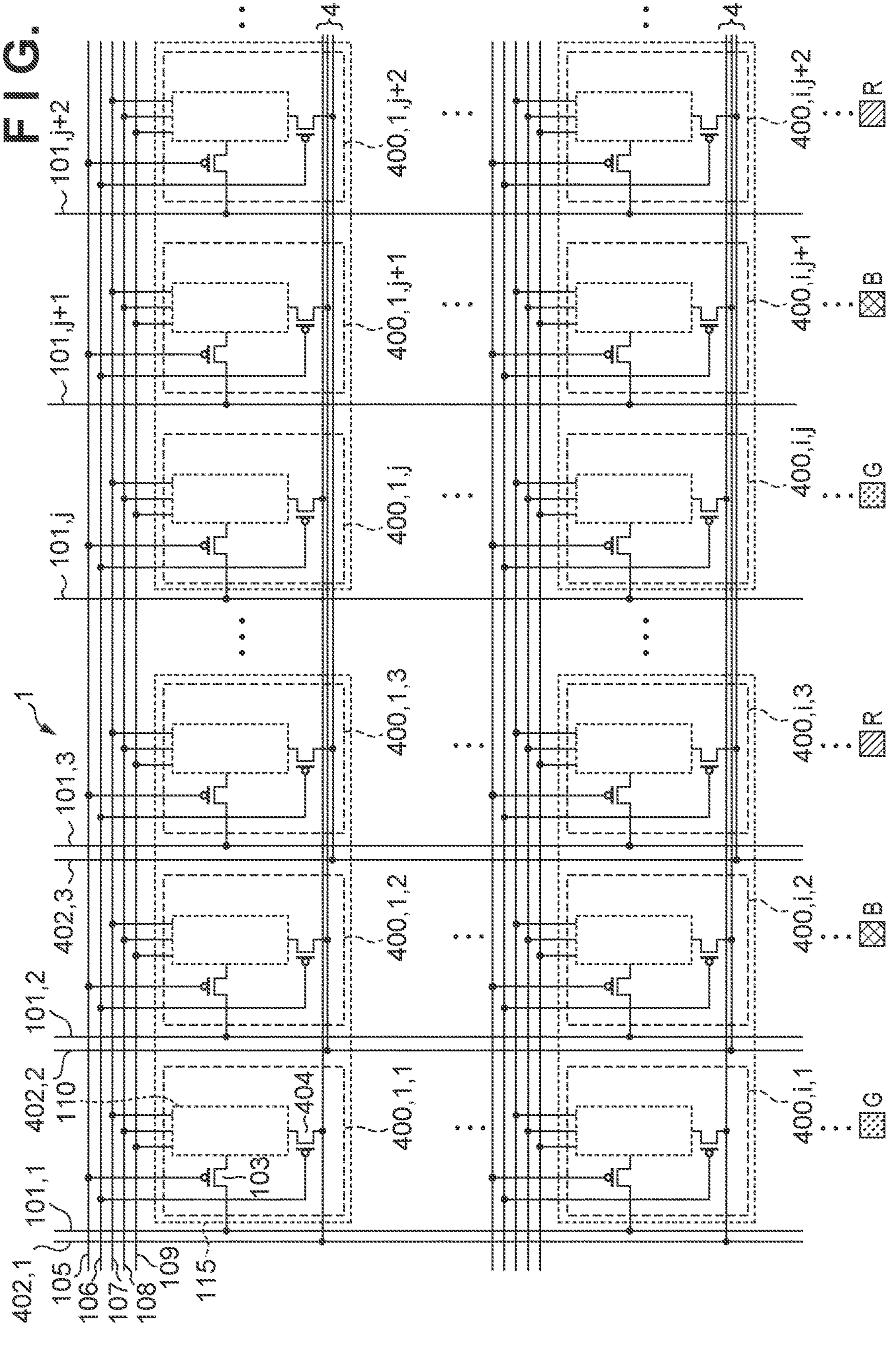
FIG. 5 is an exemplary configuration of a display apparatus according to an embodiment.

Referring to FIG. 5, there will be described an arrangement in which second selecting transistors 404 and second column signal lines 402 are shared for each light emitting color, in accordance with pixels 400 exhibiting respective light emitting colors. In FIG. 5, the second selecting transistors 404 and the second column signal lines 402 can be arranged in a dummy pixel region or the like, which is provided outside an effective pixel region including optical black (OB) elements that do not emit light or pixels unused for light emitting display.

In the present embodiment, dummy pixels are arranged as the pixels along the outermost peripheral, among the plurality of pixels of the display apparatus, and the second column signal line 402 is arranged in the region having the dummy pixels arranged therein. FIG. 5 illustrates an example in which a column of pixels 400, 1, 1 to 400, 1, 3 is arranged as dummy pixels. It becomes possible to layout the second column signal line 402 without affecting the arrangement interval between respective light emitting color pixels in the effective pixel region. Here, the reference potential is written to pixels exhibiting a same light emitting color in each row, via common signal lines 416 (here, three in each row) provided for respective light emitting colors. It may be necessary to arrange as many common signal lines 416 as the number of light emitting colors, in a manner intersecting the first column signal lines 101. Depending on the arrangement of the common signal lines 416, achievement of high definition may become less satisfying than the embodiment in FIG. 2, in a direction intersecting the scanning lines 105 to 108, the power source line 109, and the common signal lines 416. However, decrease of achievement of high definition can be suppressed for pixels arranged in a direction parallel to the common signal lines 416, i.e., pixels arranged in rows. The present embodiment also allows for achieving high definition, while maintaining a high frame rate. In addition, the common signal lines 416 intersect the first column signal lines 101 as many times as the number of light emitting colors, and therefore the coupling capacitance between signal lines may exceed that of the aforementioned embodiment, whereby the effect of realizing a high frame rate may decrease. However, increase in the number of common signal lines 416 may improve supply of the reference potential, thereby suppressing the impact caused by variation of the reference potential. Although the present embodiment is also advantageous for achieving high definition by respectively providing the second column signal lines 402 in the dummy pixel region having the plurality of pixels 400 arranged therein, the second column signal lines 402 need not necessarily be arranged in the dummy pixel region. In addition, the region for providing the second column signal lines 402 is not limited to the outermost periphery, and may be any region that exhibits little impact on display.

There will be described, referring to FIG. 6, an example of arranging the second column signal lines 602 around the outermost periphery of the region having a plurality of pixels 600 arranged therein. In the present embodiment, the second column signal lines 602 may be arranged in a region arranged with dummy pixels including optical black (OB) pixels outside the effective pixel region for performing light emitting display. In the present embodiment, the plurality of pixels 600 arranged along a row intersecting the first column signal line 101 share the second column signal line 602.

In the present embodiment, dummy pixels may be arranged around the outermost peripheral part of the column of the regions having pixels of the display apparatus arranged therein, and the second column signal line 602 may be arranged in the dummy pixel region. Consequently, it becomes possible to provide a layout that does not affect the interval between pixels exhibiting respective light emitting colors in the effective pixel region. In addition, one common signal line 616 is arranged for each of the pixels 600 arranged in a direction intersecting the first column signal lines 101. In other words, one common signal line 616 is arranged for each of the plurality of pixels 600 arranged along a row. Accordingly, the structure of the present embodiment is advantageous for achieving high definition in a direction intersecting and a direction parallel to the scanning lines 105 to 108, the power source line 109, and the common signal lines 616. In particular, the second column signal line 602 may be arranged along the pixels arranged in the outermost periphery, in which dummy pixels are arranged, facilitating achievement of a high frame rate and high definition. Also the coupling capacitance is mitigated in comparison with the embodiment arranging as many common signal lines as the number of light emitting colors, whereby the effect of high frame rate can be enhanced.

There will be described an example of sharing the second column signal line by mutually short-circuiting the plurality of common signal lines 616 arranged along a row of pixels arranged in a manner forming a plurality of rows and a plurality of columns, referring to FIG. 7. The present embodiment is applicable to each of the embodiments described above. FIG. 7 will be described as a modification example of the embodiment of FIG. 6. In FIG. 6, the second column signal line 602 is arranged along pixels exhibiting light emitting colors along the first column of the pixels 600 arranged in a manner forming a plurality of rows and a plurality of columns. In the example illustrated in FIG. 7, the common signal lines 616 arranged along adjacent rows are mutually connected by a short line 620 intersecting the common signal line 616 to short-circuit the common signal lines 616 to each other, in addition to the configuration illustrated in the embodiment illustrated in FIG. 6. In FIG. 7, the common signal lines 616 arranged along a plurality of rows are short-circuited to each other by a short line 620, where it is advantageous to arrange one short line 620 between a plurality of columns of pixels for achieving high definition in the direction parallel to the first column signal lines.

Figure 6:
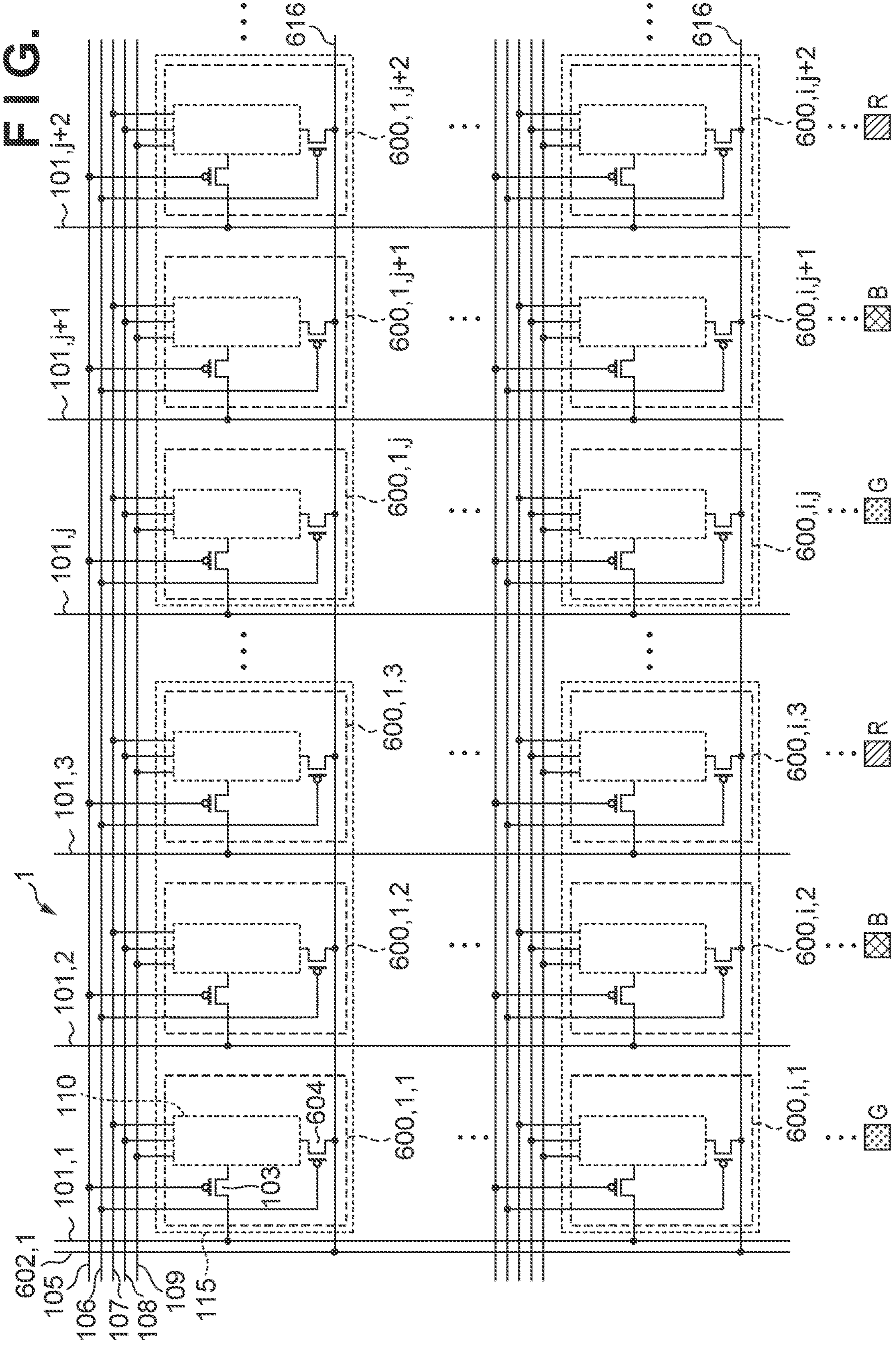
FIG. 6 is an exemplary configuration of a display apparatus according to an embodiment.
Figure 7:
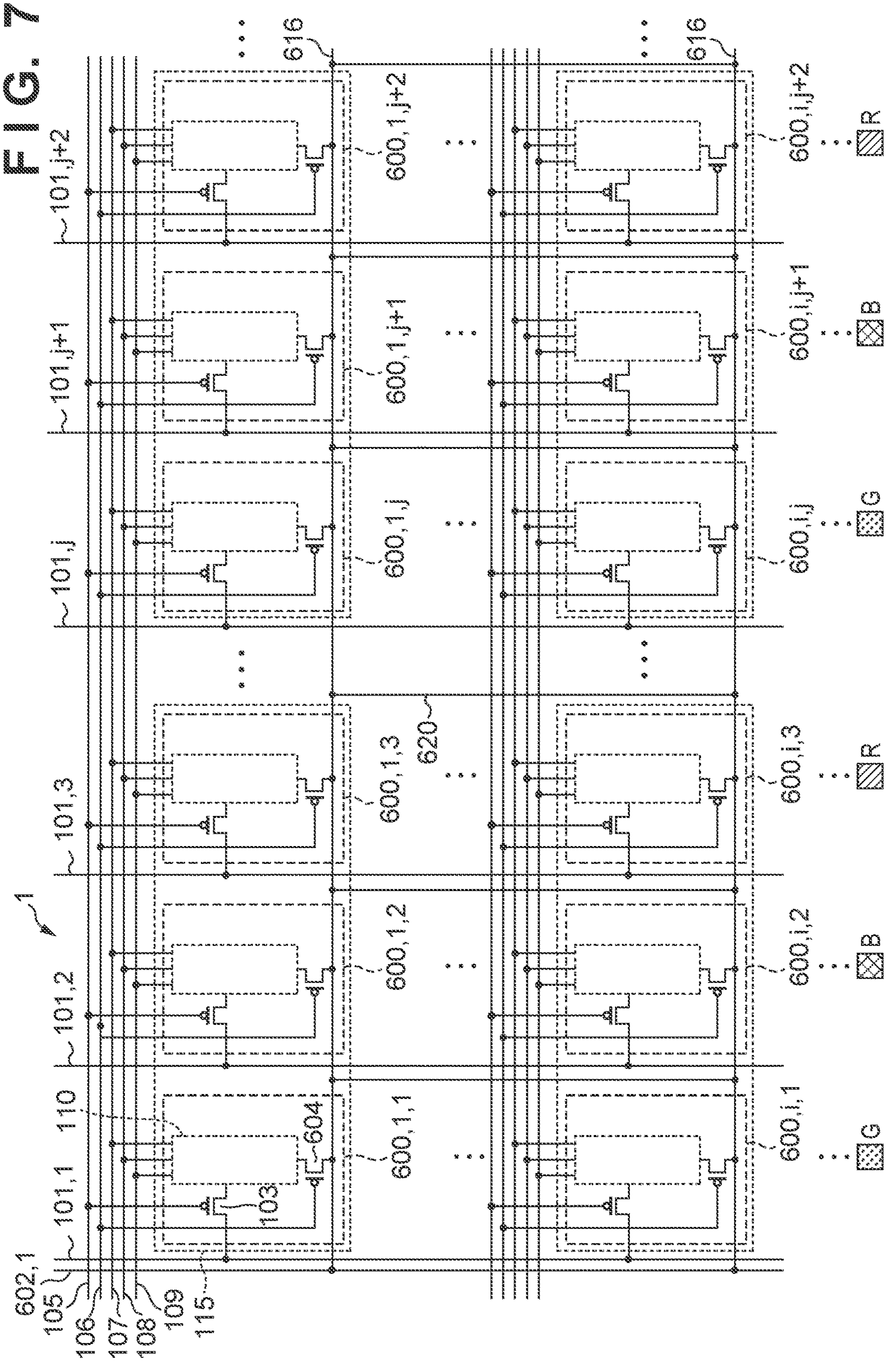
FIG. 7 is an exemplary configuration of a display apparatus according to an embodiment.

Achievement of high definition in the direction parallel to the scanning lines 105 to 108, the power source line 109, and the common signal line 616 may exhibit an effect similar to the example of FIG. 6. Achievement of high definition in the direction intersecting the common signal line 616 is disadvantageous due to arrangement of the short line 620 in order to short-circuit the common signal lines 616. However, short-circuiting the common signal lines 616 is advantageous for reducing the resistance in terms of supply of the reference potential, thus allows for reducing the effect of time until settlement of the reference potential, taking into account the disadvantage of increase of coupling capacitance, and therefore can increase the tolerance against variation of reference potential. In addition, the short line 620 may be arranged one for a plurality of columns in a one-to-many manner, thereby suppressing decrease of achievement of high definition. Here, it is also possible to minimize the time until settlement of the reference potential by collectively turning ON the second selecting transistors 604 provided in a plurality of rows.

In addition, although not illustrated, sharing the first column signal line 101 and the first selecting transistor 103 by pixels exhibiting a plurality of light emitting colors allows for achieving still higher definition.

Figure 8:
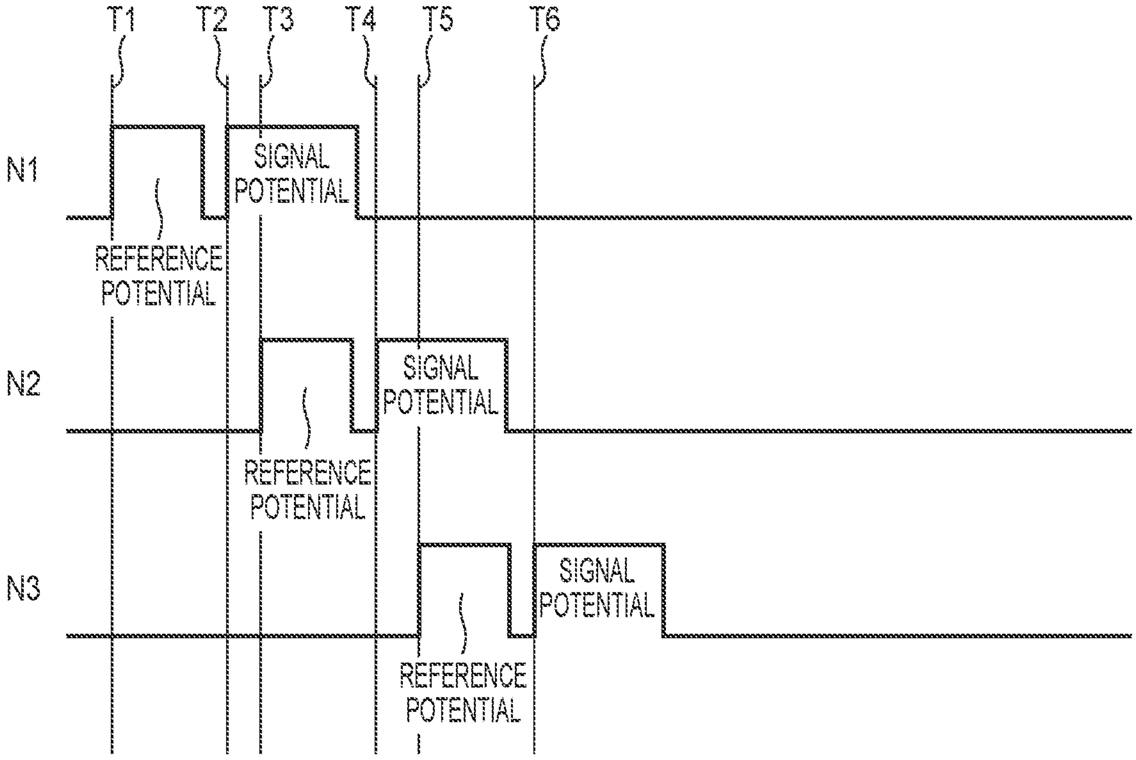
FIG. 8 is an explanatory diagram of pixel driving timing according to an embodiment.

There will be described an example of pixel driving timing according to each of the aforementioned embodiments. The present embodiment describes, for each of the aforementioned embodiments, a driving method that can achieve a still higher frame rate. Here, the exemplary configuration of FIG. 4 will be described, referring to FIG. 8, which is a simplified version of the timing chart of FIG. 3. FIG. 8 illustrates a timing of providing the reference potential and the signal potential to the pixel 200. In FIG. 8, N1, N2 and N3 respectively represent driving of the pixels 200 arranged for different rows aligned parallel to the first column signal lines 101 of FIG. 4. Specifically, for example, N1 represents driving of pixels 200, 1, 1, 200, 1, 2, 200, 1, 3, . . . , 200, 1, n. N2 represents driving of pixels 200, 2, 1, 200, 2, 2, 200, 2, 3, . . . , 200, 2, n. N3 represents driving of pixels 200, 3, 1, 200, 3, 2, . . . , 200, 3, n.

The driving proceeds as follows. In N1, from the time point T1, the reference potential is written to the pixels 200, 1, 1, 200, 1, 2, 200, 1, 3, . . . , 200, 1, n, and subsequently the signal potential is written from the time point T2. In N2, from the time point T3, the reference potential is written to the pixels 200, 2, 1, 200, 2, 2, 200, 2, 3, 200, 2, 3, . . . , 200, 2, n, and subsequently the signal potential is written from the time point T4. The period of the reference potential written to the pixels 200, 2, 1, . . . , 200, 2, n from the time point T3 is included in the period of the signal potential written to the pixels 200, 1, 1, . . . , 200, 1, n from the time point T2. The periods are overlapping. In the example illustrated in FIG. 8, driving is performed in the foregoing manner so that the time until settlement of the reference potential can fall within the period of the signal potential, whereby the time required for driving can be significantly reduced. The driving allows for achieving a still higher frame rate. Although the longer the wiring length of the second column signal line 202 becomes, the longer the time for settlement is required, the effect of the time required for settlement can be reduced by overlapping the settlement time with the writing period of the signal potential. Although the present embodiment has been described taking the configuration of FIG. 4 as an example, other embodiments may also achieve a high frame rate by overlapping the writing period of the signal potential and the writing period of the reference potential.

Figure 9:
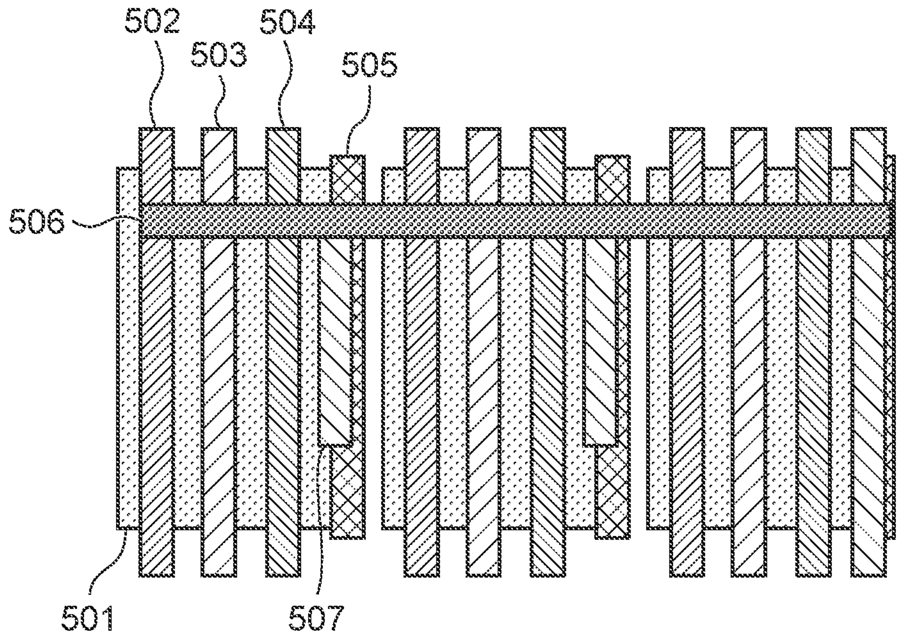
FIG. 9 is a plan view for explaining an arrangement of a display apparatus according to an embodiment.

Referring to FIG. 9, there will be described an example of a specific wiring layout of the display apparatus. FIG. 9 is a plan view of some of the pixels arranged in a matrix. Here, FIG. 9 will be explained taking an example of three pixels aligned as in FIG. 4. An element region 501 illustrated in FIG. 9 is a region for arranging transistors, holding capacitors, and light-emitting elements included in the pixels 200. In addition, there is arranged wiring for driving the pixels 200. There are arranged an image signal line 502 corresponding to the first column signal line 101, a reference signal line 507 corresponding to the second column signal line 202, and a local reference signal line 506 corresponding to the common signal line 616. There are also arranged a power source voltage line 503 connected to the power source line 109, and a reference GND line 504 which turns out to be the reference potential of light-emitting elements. The pixel 200 includes the holding capacitors 121 and 122. With respect to the holding capacitor 121 and 122, a shield wiring 505 is arranged between pixels aligned along rows in FIG. 9, in order to reduce the interference between the pixels 200 caused by adjacent holding capacitors. The shield wiring is not limited to the arrangement of FIG. 9. It may be arranged in a manner surrounding the holding capacitors.

Here, a part of the shield wiring 505 is used as the reference signal line 507 for supplying the reference potential. Writing of the reference potential to the pixel 200 is performed by using the shield wiring 505 as an input line to the pixel, and combining the connection with the local reference signal line 506. The reference potential from the reference signal line 507 is written to the shield wiring 505 between respective pixels via the local reference signal line 506. The reference potential is supplied to the pixels via the shield wiring 505. In addition, the second column signal line 202 may be concurrently used as the shield wiring. When using the second column signal line as the shield wiring, the width of the second column signal line can be made wider than the width of the first column signal line. The wider the width of the second column signal line than the width of normal wiring, the larger shielding effect can be expected. In such a case, the number of additional wirings for supplying the reference potential can be suppressed, whereby the layout interval of the pixels 200 in plan view can be reduced.

Figure 10:
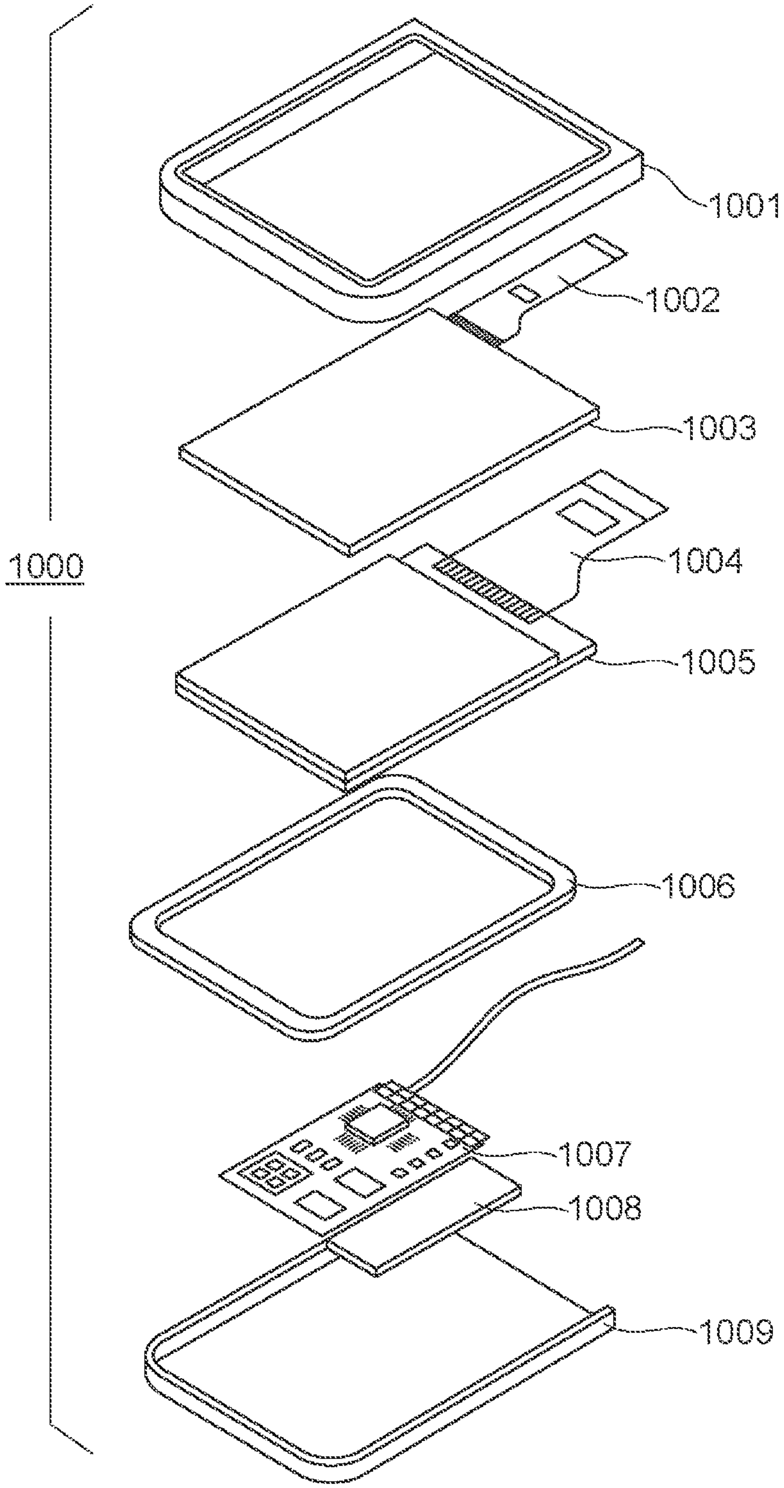
FIG. 10 is an application example of the display apparatus of the present disclosure.

Next, a device that uses the display apparatus according to the present embodiment will be described, referring to FIG. 10. A display apparatus 1000 may include, between an upper cover 1001 and a lower cover 1009, a touch panel 1003, a display panel 1005, a frame 1006, a circuit board 1007, and a battery 1008. The touch panel 1003 and the display panel 1005 have flexible print circuits FPC 1002 and 1004 connected thereto. The circuit board 1007 has circuit elements such as transistors mounted thereon. The display apparatus 1 according to the present embodiment can be applied to the display panel 1005. The display panel 1005 can be driven by a transistor mounted on the circuit board 1007. The battery 1008 need not be provided when the display apparatus is not a portable device, or need not be provided at this position when the display apparatus is a mobile device.

The display apparatus according to the present embodiment may include a color filter having red, green and blue color. The color filter may have the red, green and blue color elements arranged in a delta array. The display apparatus according to the present embodiment may be used for a display unit of a mobile terminal. In such a case, the display apparatus may have both a display function and an operating function. The mobile terminal may be a mobile phone such as a smartphone, a tablet, a head-mounted display, or the like.

The display apparatus according to the present embodiment may be used for a display unit of an image capturing apparatus including an optical unit including a plurality of lenses, and an image capturing device that receives light passing through the optical unit. The image capturing apparatus may include a display unit configured to display information acquired by the image capturing devices. In addition, the display unit may be a display unit exposed outside the image capturing apparatus, or a display unit provided within a viewfinder. The image capturing apparatus may be a digital camera, or a digital video camera.

Figure 11A:
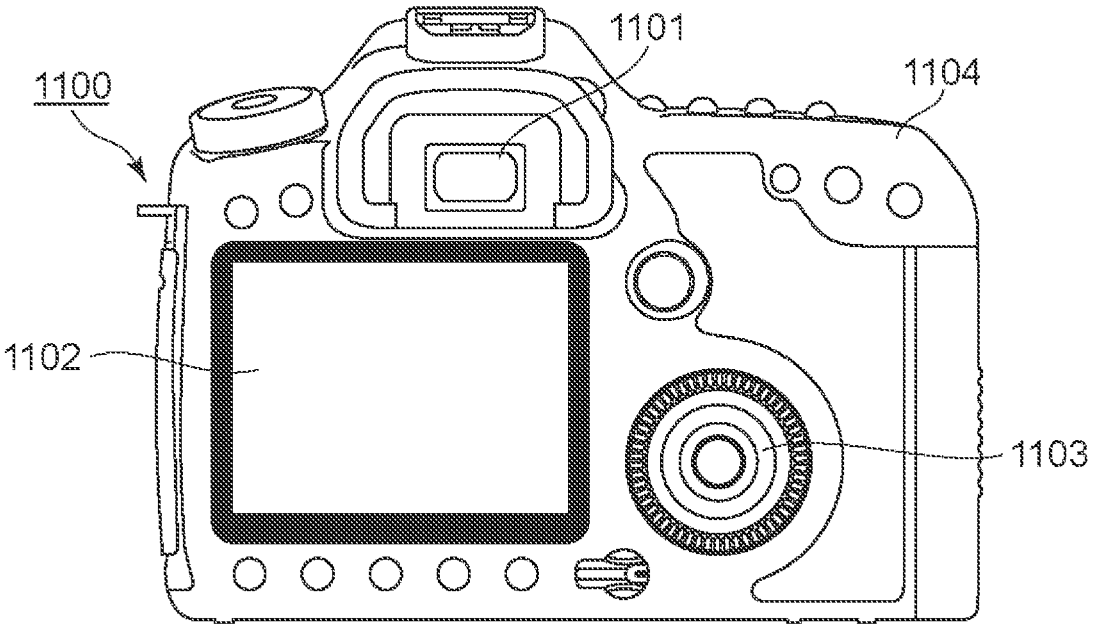
FIG. 11A is an example of an image capturing apparatus.

FIG. 11A is a schematic diagram illustrating an example of an image capturing apparatus according to the present embodiment. An image capturing apparatus 1100 may include a view finder 1101, a rear display 1102, an operation unit 1103, and a housing 1104. The display apparatus 1 according to the present embodiment can be applied to the view finder 1101. In such a case, the display apparatus 1, functioning as a display unit, may display not only images being captured but also environment information, image capturing instruction, or the like. The environment information may be intensity of ambient light, orientation of ambient light, movement speed of the subject, possibility of the subject being shielded by a shielding object, or the like.

The timing suitable for image capturing is a short time, and therefore the information should be displayed as soon as possible. Accordingly, a light emitting unit using an organic light-emitting element according to the embodiment is suitable for the display apparatus. This is because the response speed of the organic light-emitting element is generally faster than a liquid crystal display apparatus. The display apparatus using the organic light-emitting element may be suitable for an apparatus that prioritizes display speed.

The image capturing apparatus 1100 includes an optical unit (not illustrated). The optical unit may include a plurality of lenses. The optical unit forms a subject image on image capturing devices accommodated within the housing 1104. The plurality of lenses can adjust the focus by adjusting their relative positions. The operation can be automatically performed. The image capturing apparatus may also be referred to as a photoelectric conversion apparatus. The photoelectric conversion apparatus can include a method of detecting a difference from a preceding image, a method of cutting out an image from images constantly being recorded, or the like, as a method of image capturing, instead of performing sequential image capturing.

Figure 11B:
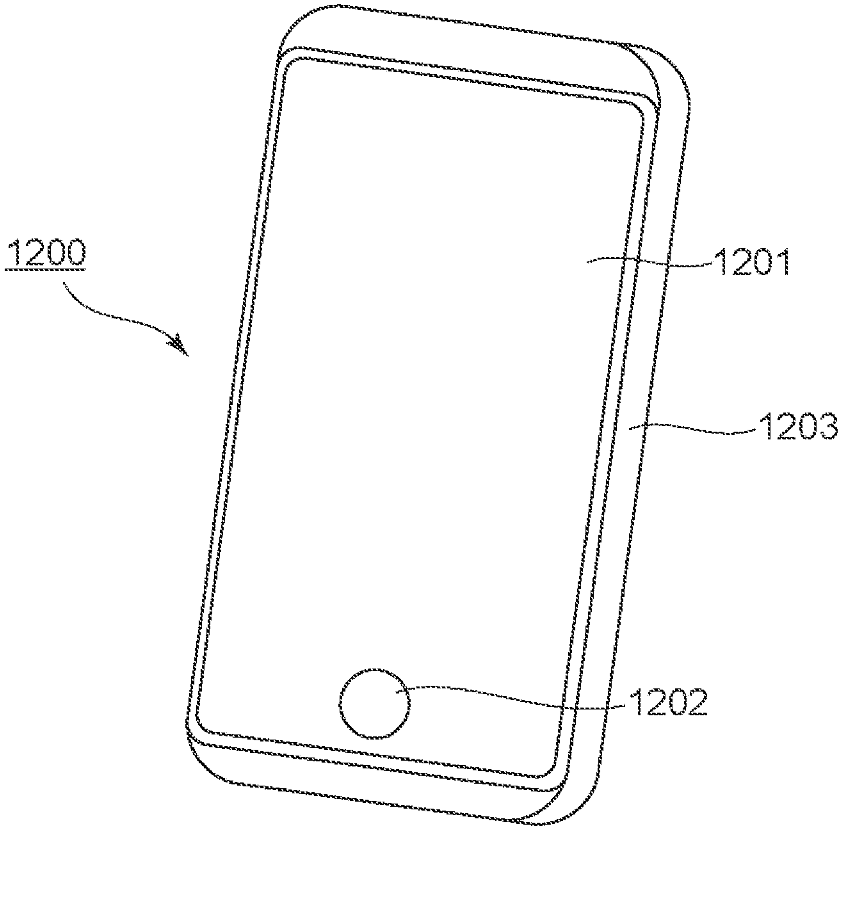
FIG. 11B is an example of an electronic device.

FIG. 11B is a schematic diagram illustrating an example of an electronic device according to the present embodiment. An electronic device 1200 includes a display unit 1201, an operation unit 1202, and a housing 1203. The housing 1203 may include a circuit, a print circuit board including the circuit, a battery, and a communication unit. The operation unit 1202 may be a button, or a reaction unit of a touch panel type. The operation unit may be a biometric recognition unit that recognizes a fingerprint to release a lock, or the like. The electronic device including the communication unit may also be referred to as a communication device. The electronic device may include a lens and an image capturing device to further provide a camera function. An image captured by the camera function is displayed on the display unit. The electronic device may be a smartphone, a notebook-type personal computer, or the like.

Figure 12A:
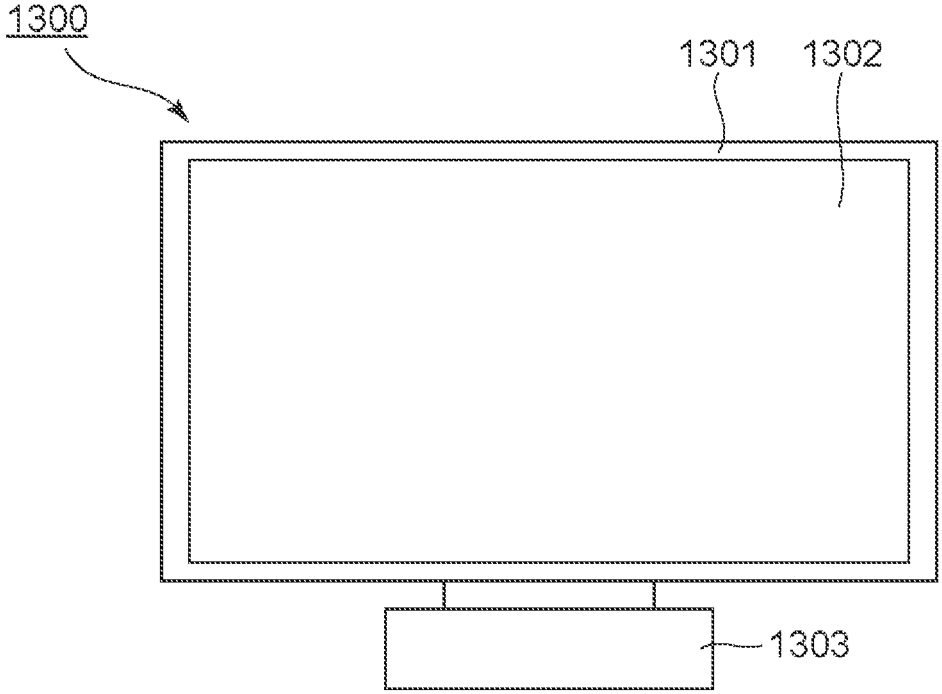
FIG. 12A is an example of a display apparatus.
Figure 12B:
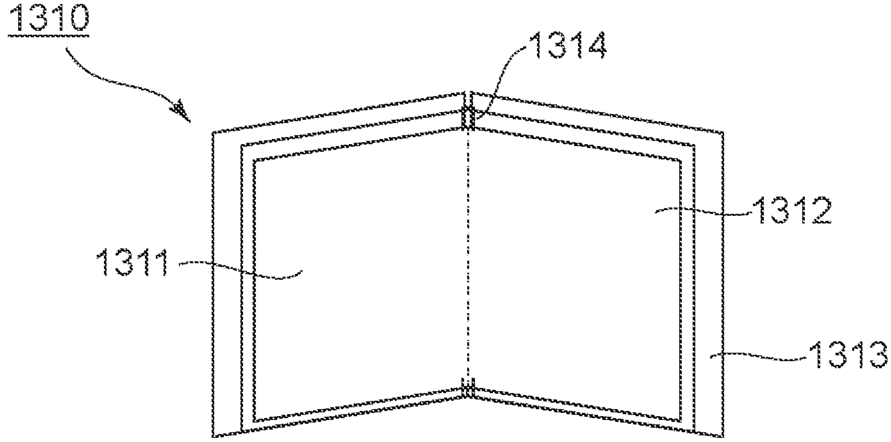
FIG. 12B is an example of a foldable display apparatus.

FIGS. 12A and 12B are schematic diagrams each illustrating an example of a display apparatus using the display apparatus 1 of the present embodiment. FIG. 12A may illustrate a display apparatus such as a TV monitor or a PC monitor. The display apparatus 1300 includes a frame 1301 and a display unit 1302. The display apparatus 1 according to the present embodiment can be applied to the display unit 1302. The display apparatus 1300 includes a base 1303 that supports the frame 1301 and the display unit 1302. The base 1303 is not limited to the form of FIG. 12 (A). The lower edge of the frame 1301 may also serve as a base. In addition, the frame 1301 and the display unit 1302 may be curved. The radius of curvature may be equal to or larger than 5000 mm and equal to or smaller than 6000 mm.

FIG. 12B is a schematic view illustrating another example of a display apparatus using the display apparatus 1 according to the present disclosure. The display apparatus 1310 of FIG. 12 (B), being configured to be foldable, is a so-called foldable display apparatus. The display apparatus 1310 includes a first display unit 1311, a second display unit 1312, a housing 1313, and a bent point 1314. The display apparatus 1 according to the embodiment can be applied to the first display unit 1311 and the second display unit 1312. The first display unit 1311 and the second display unit 1312 may be a seamless monolithic display apparatus. The first display unit 1311 and the second display unit 1312 can be separated at a bent point 1314. The first display unit 1311 and the second display unit 1312 may respectively display different images, or the first and second display units may display a single image together.

Figure 13A:
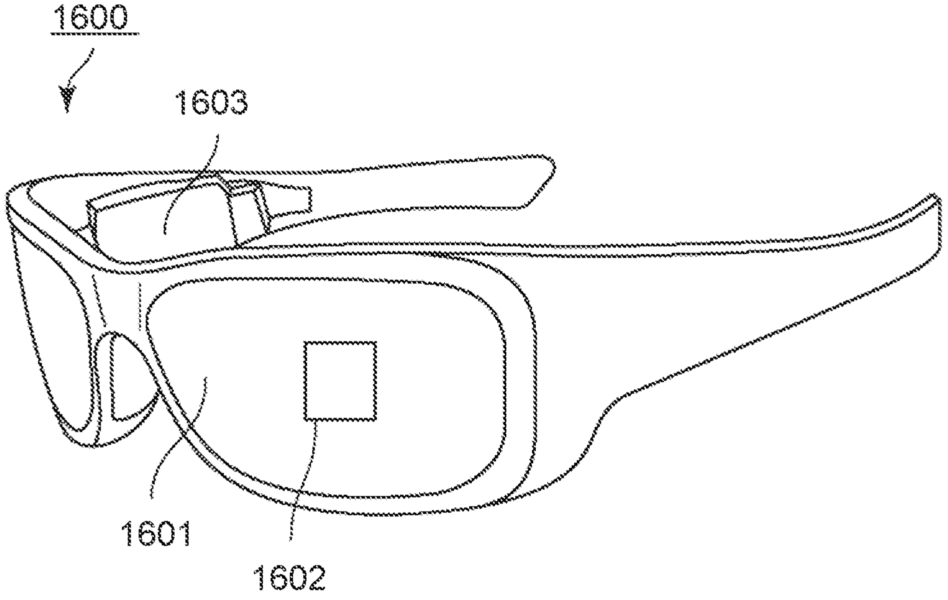
FIG. 13A is an example of a wearable device.
Figure 13B:
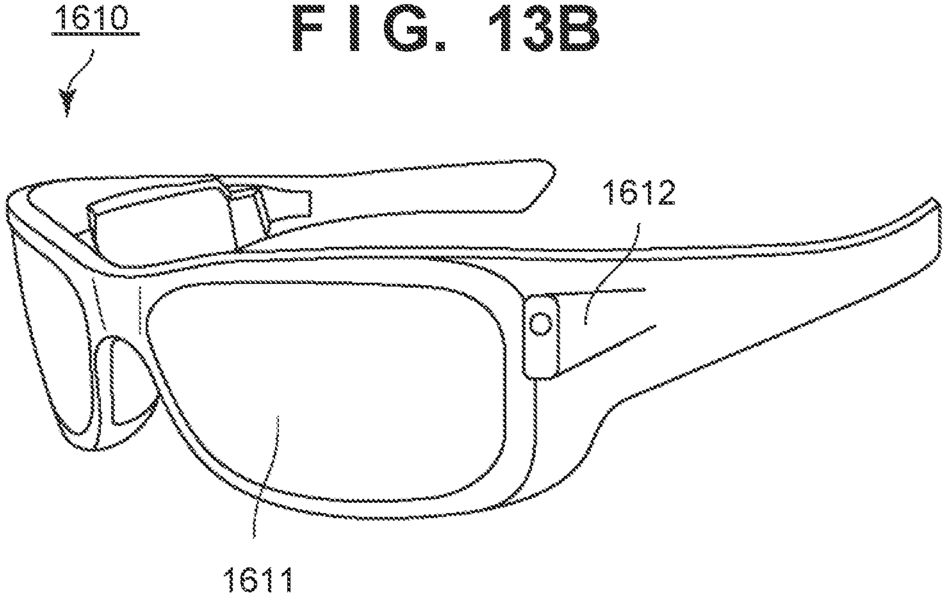
FIG. 13B is an example of a wearable device including an image capturing apparatus.

Referring to FIGS. 13A and 13B, there will be described an example of application to additional devices of the display apparatus 1 according to each of the aforementioned embodiments. The display apparatus 1 may be applied to a system that can be worn as a wearable device such as, for example, smart glasses, an HMD, and smart contact lenses. An image capturing and displaying apparatus used in such an application example includes an image capturing apparatus that can photoelectrically convert visible light, and a display apparatus that can emit visible light.

Referring to FIG. 13A, there will be described a pair of eyeglasses 1600 (smart glasses) as an example. An image capturing apparatus 1602 such as a CMOS sensor or an SPAD is provided on the front surface side of a lens 1601 of the eyeglasses 1600. In addition, the display apparatus 1 according to each of the embodiments described above is provided on the back surface side of the lens 1601. The eyeglasses 1600 further includes a control apparatus 1603. The control apparatus 1603 functions as a power source that supplies power to a display apparatus including the image capturing apparatus 1602 and the display apparatus 1 according to respective embodiments. The control apparatus 1603 controls the operation of the image capturing apparatus 1602 and the display apparatus 1. An optical system for focusing light on the image capturing apparatus 1602 is formed in the lens 1601.

Referring to FIG. 13B, there will be described another pair of eyeglasses 1610 (smart glasses) as an example. The eyeglasses 1610 include a control apparatus 1612, on which are mounted an image capturing apparatus corresponding to the image capturing apparatus 1602, and a display apparatus 1 according to the present disclosure. The lens 1611 has formed thereon an image capturing apparatus within the control apparatus 1612 and an optical system for projecting a display from the display apparatus 1, and an image is projected on the lens 1611. The control apparatus 1612 functions as a power source for supplying power to the image capturing apparatus and the display apparatus 1, and also controls the operation of the image capturing apparatus and the display apparatus 1. The control apparatus may include a line-of sight detection unit that detects the line-of sight of the wearer. Infrared light may be used for the detection of the line-of-sight. An infrared light emitting unit emits infrared light to the eye of the user gazing the image being displayed. A captured image of the eye is acquired by detecting, by the image capturing unit including a light-receiving element, the reflected light of the emitted infrared light from the eye. On this occasion, it is possible to suppress reduction of image quality by providing a part that reduces incident light from the infrared light emitting unit to the display unit in plan view.

The user's line-of sight toward the displayed image is detected from the captured image of the eye acquired by image capturing using infrared light. Any technique can be applied to line-of sight detection using the captured image of the eye. As an example, a line-of sight detection method can be used, which is based on a Purkinje image formed by reflection of irradiated light at the cornea. More specifically, a line-of sight detection process based on the pupil corneal reflection method is performed. Using the pupil corneal reflection method, the user's line-of sight is detected by calculating a line-of sight vector representing the orientation (rotation angle) of the eye, based on the image of the pupil and the Purkinje image included in the captured image of the eye.

The display apparatus including the display apparatus 1 according to the present disclosure includes an image capturing apparatus including a light-receiving element, and may control the image displayed on the display apparatus based on the user's line-of sight information from the image capturing apparatus. Specifically, the display apparatus may determine, based on the line-of sight information, a first field of view region being gazed by the user, and a second field of view region other than the first field of view region. The first field of view region and the second field of view region may be determined by the control apparatus of the display apparatus, or may be received as those determined by an external control apparatus. In the display region of the display apparatus, the display resolution of the first field of view region may be controlled to be higher than the display resolution of the second field of view region. In other words, the resolution of the second field of view region may be set lower than the first field of view region.

Further, the display region includes a first display region and a second display region which is different from the first display region, and the region having a higher priority may be determined from the first display region and the second display region, based on the line-of sight information. The first field of view region and the second field of view region may be determined by the control apparatus of the display apparatus, or may be received as those determined by an external control apparatus. The resolution of the higher priority region may be controlled to be higher than the resolution of regions other than the higher priority region. In other words, resolution of the region with a relatively low priority may be reduced.

Here, AI may be used for determining the first field of view region or a region with a higher priority. AI may be a model configured to estimate, from an image of an eye, the angle of the line of sight and the distance to an object beyond the line-of sight based on training data. The training data may be generated by using images of eyes and directions in which the eyes in the images are actually gazing. The AI program may be included in the display apparatus, in the image capturing apparatus, or in an external device. In a case where an external device includes the AI program, it is transmitted to the display apparatus via communication.

When performing display control based on the line-of sight information, it is possible to be applied to smart glasses further including an image capturing apparatus that captures an image of the outside. The smart glasses can display the captured external information in real time.

As has been described above, using an apparatus employing the organic light-emitting elements according to the present disclosure allows for performing display having a good image quality and a stability for long-time display. In addition, it is possible to provide a technique which is advantageous for achieving high definition, while maintaining a high frame rate of the display apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2021-039531, filed Mar. 11, 2021, and 2021-196468, filed Dec. 2, 2021 which are hereby incorporated by reference herein in their entirety.

What is claimed is:

1. A display apparatus comprising:

a plurality of pixels arranged in a manner forming a plurality of rows and a plurality of columns;

a plurality of first column signal lines configured to supply a signal potential to the plurality of pixels in accordance with video data; and a second column signal line configured to supply a reference potential to the plurality of pixels, wherein each of the plurality of pixels includes (1) a light-emitting element, (2) a driving transistor configured to drive the light-emitting element, (3) a first selecting transistor configured to supply the signal potential from a first column signal line of the plurality of first column signal lines to a control electrode of the driving transistor, and (4) a second selecting transistor configured to supply the reference potential from the second column signal line to the control electrode of the driving transistor, wherein the plurality of first column signal lines and the second column signal line are arranged along columns of the plurality of pixels, wherein the second column signal line is connected in common to pixels of at least two columns, among the plurality of pixels, via the second selecting transistor, wherein the second column signal line is connected to a plurality of common signal lines arranged along respective rows, and wherein the plurality of common signal lines are connected by a short line arranged parallel to the first column signal line.

2. The display apparatus according to claim 1, wherein the plurality of columns include (1) a first pixel column including a first pixel and (2) a second pixel column including a second pixel, and wherein the second column signal line is connected to the first pixel and the second pixel.

3. The display apparatus according to claim 1, wherein the plurality of pixels are arranged as units of at least three pixels, each of the at least three pixels exhibiting a different light emitting color, and wherein the second column signal line is connected in common to the at least three pixels included in the units via the second selecting transistor.

4. The display apparatus according to claim 3, wherein the units are arranged in a stripe, wherein a plurality of the second column signal lines are provided, each corresponding to a respective one of the units.

5. The display apparatus according to claim 3, wherein the three pixels included in the same unit are arranged in the same row.

6. The display apparatus according to claim 1, wherein the plurality of pixels includes a plurality of pixels each exhibiting a different light emitting color, wherein a plurality of the second column signal lines are arranged, each corresponding to a different light emitting color and being connected in common to pixels exhibiting the same light emitting color, via the second selecting transistor.

7. The display apparatus according to claim 1, wherein the plurality of pixels includes a dummy pixel region arranged along a column, and wherein the second column signal line is arranged in the dummy pixel region.

8. The display apparatus according to claim 1, further comprising a shield wiring arranged between adjacent pixels arranged along a row, the shield wiring being configured to provide shielding between pixels.

9. The display apparatus according to claim 8, wherein the second column signal line also serves as the shield wiring.

10. The display apparatus according to claim 9, wherein a width of the second column signal line is wider than a width of the first column signal line.

11. The display apparatus according to claim 1, wherein a period during which the first selecting transistor of pixels of a predetermined row supplies the signal potential from the first column signal lines to a control electrode of the driving transistor overlaps with a period during which the second selecting transistor of pixels of a row which is different from the predetermined row supplies the reference potential from the second column signal line to the control electrode of the driving transistor.

12. A photoelectric conversion apparatus comprising:
an optical unit including a plurality of lenses;
an image capturing device configured to receive light having passed through the optical unit; and
a display unit configured to display an image captured by the image capturing device, the display unit including the display apparatus according to claim 1.

13. An electronic device comprising:
a display unit including the display apparatus according to claim 1;
a housing having the display unit provided therein; and
a communication unit provided in the housing and configured to communicate with outside.

14. A display apparatus comprising:
a plurality of pixels arranged in a matrix;
a plurality of first column signal lines configured to supply a signal potential to the plurality of pixels in accordance with video data; and
a plurality of second column signal lines configured to supply a reference potential to the plurality of pixels,
wherein the plurality of first column signal lines and the plurality of second column signal lines are arranged along columns of the plurality of pixels,
wherein a plurality of red pixels, a plurality of green pixels, and a plurality of blue pixels are arranged in each row of the plurality of pixels,
wherein a plurality of common signal lines in each row are respectively connected to the plurality of second column signal lines,
wherein the plurality of common signal lines in each row respectively connect the plurality of red pixels, the plurality of green pixels, and the plurality of blue pixels in a same row, and
wherein each of the plurality of common signal lines arranged in one row is connected by a respective one of a plurality of short lines to a respective one of the plurality of common signal lines arranged in another row.

15. A photoelectric conversion apparatus comprising:
an optical unit including a plurality of lenses;
an image capturing device configured to receive light having passed through the optical unit; and
a display unit configured to display an image captured by the image capturing device, the display unit including the display apparatus according to claim 14.

16. An electronic device comprising:
a display unit including the display apparatus according to claim 14;
a housing having the display unit provided therein; and
a communication unit provided in the housing and configured to communicate with outside.

17. The display apparatus according to claim 1, wherein the short line is not connected to a power source.

18. The display apparatus according to claim 14, wherein the plurality of short lines are not connected to a power source.

19. A display apparatus comprising:
a plurality of pixels arranged in a manner forming a plurality of rows and a plurality of columns;
a plurality of first column signal lines configured to supply a signal potential to the plurality of pixels in accordance with video data; and
a second column signal line configured to supply a reference potential,
wherein each of the plurality of pixels in a first region includes (1) a light-emitting element, (2) a driving transistor configured to drive the light-emitting element, (3) a first selecting transistor configured to supply the signal potential from a first column signal line of the plurality of first column signal lines to a control electrode of the driving transistor, and (4) a second selecting transistor configured to supply the reference potential from the second column signal line to the control electrode of the driving transistor,
wherein the plurality of first column signal lines is arranged along columns of the plurality of pixels in the first region,
wherein, among the plurality of pixels, pixels provided in a second region adjacent to the first region in a row direction are dummy pixels, and
wherein the second column signal line extends only in the second region and is connected in common to each pixel, via the second selecting transistor of that pixel, of pixels of at least two columns, among the plurality of pixels.

20. The display apparatus according to claim 19, wherein the plurality of pixels in the first region are arranged as units of at least three pixels, each of the at least three pixels exhibiting a different light emitting color, and
wherein the second column signal line is connected in common to the at least three pixels included in the units via the second selecting transistor.

* * * * *